United States Patent Office 3,240,783
Patented Mar. 15, 1966

3,240,783
CYANOMETHYLIDENE QUINOLINES
James M. Straley, David J. Wallace, and Max A. Weaver, Kingsport, Tenn., assignors to Eastman Kodak Company, Rochester, N.Y., a corporation of New Jersey
No Drawing. Filed Jan. 18, 1963, Ser. No. 252,285
8 Claims. (Cl. 260—283)

This invention relates to novel compounds containing a dicarboximido radical, and more particularly to methine compounds, such as methine dyestuffs, containing a dicarboximido radical. Particular methine compounds containing this radical are obtained by condensing nitriles containing an active methylene group with tetrahydroquinolinyl aldehydes containing the dicarboximido radical.

The methine compounds of the invention have the general formula:

(I) 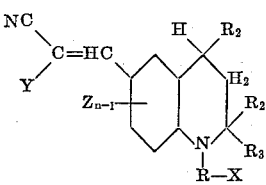

wherein

R=an alkylene radical straight or branch-chained, particularly lower alkylene, such as $-(CH_2)_{n'}-$ wherein $n'$ is a positive integer from 1 to 4.

$R_1$, $R_2$, and $R_3$ each=a hydrogen atom or a lower alkyl group, particularly methyl.

X=a dicarboximido radical such as phthalimido, succinimido, maleimido, citraconimido, etc., as indicated in the examples below, derived from the corresponding anhydride.

Y=either —CN, an amide radical as —CONH$_2$, a carbalkoxy radical, particularly the lower carbalkoxy radicals as —COOCH$_3$ and —COOC$_3$H$_7$, or a cyanocarbalkoxy radical, particularly lower cyanocarbalkoxy radicals as —COOC$_2$H$_4$CN.

$Z_{n-1}$=the substituents in at least one of the 5-, 7-, or 8-positions of the tetrahydroquinoline nucleus, wherein Z is either a lower alkyl group, e.g., methyl; a lower alkoxy group, e.g., methoxy; or a halogen atom, including chlorine or bromine.

$n$=a positive integer from 1 to 4.

The methine compounds of the invention having Formula I above are prepared by condensing nitriles containing an active methylene group with formylated N-dicarboximidoalkyltetrahydroquinolines according to the following reaction.

(II) 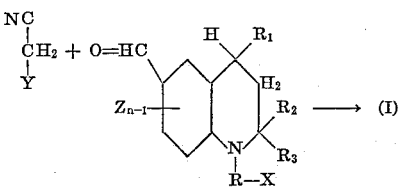

wherein R, $R_1$, $R_2$, $R_3$, X, Y, Z and $n$ have the same meaning as given above. A typical methine compound thus obtainable has the structure given in Example 1.

The dicarboximido radical X of the azo compounds and coupling components of Formulas I and II above, has the following general formula

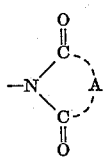

wherein

A represents the atoms necessary to complete a ring containing 4 or 5 carbon atoms in addition to the nitrogen atom, i.e., the hydrocarbon residue of the dicarboxylic acid anhydride from which the radical is derived, including substituted and unsubstituted alkylene, vinylene and ortho-phenylene groups such as —CH$_2$CH$_2$— in the succinimido radical

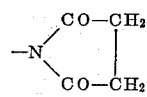

The 6-formyl - N - dicarboximidoalkyltetrahydroquinolines (Formula II) used in the above reaction are obtained by formylation of the corresponding N-dicarboximidoalkyltetrahydroquinoline, for example, by reaction with dimethylformamide in the presence of phosphorus oxychloride as illustrated in Example 1 below.

The N-dicarboximidoalkyltetrahydroquinoline starting materials are produced by condensation of the dicarboxylic acid anhydrides with N-aminoalkyltetrahydroquinolines as illustrated in Example 1 below.

The following are representative starting materials useful in preparing the methine compounds of our invention.

N-(β-aminoethyl)-2,7-dimethyl-1,2,3,4-tetrahydroquinoline
N-(β-aminopropyl)-2,7-dimethyl-1,2,3,4-tetrahydroquinoline
N-(β-aminoethyl)-2,2,4,7-tetramethyl-1,2,3,4-tetrahydroquinoline
N-(β-aminoethyl)-2,2,4-trimethyl-1,2,3,4-tetrahydroquinoline
N-(β-aminopropyl)-2,2,4,7-tetramethyl-1,2,3,4-tetrahydroquinoline
N-(β-aminoethyl)-2-isopropyl-7-methyl-1,2,3,4-tetrahydroquinoline
N-(β-aminoethyl)-2,4,7-trimethyl-1,2,3,4-tetrahydroquinoline
N-(β-aminoethyl)-2,5,8-trimethyl-1-,2,3,4-tetrahydroquinoline
N-(β-aminoethyl)-1,2,3,4-tetrahydroquinoline
N-(β-aminoethyl)-2-methyl-7-methoxy-1,2,3,4-tetrahydroquinoline As mentioned above, these N-aminoalkyltetrahydroquinolines are condensed with anhydrides, such as, phthalic, succinic, maleic, hexahydrophthalic, tetrahydrophthalic, 3-nitrophthalic and glutaric anhydrides to produce the corresponding N-dicarboximidoalkyltetrahydroquinolines from which the methine compounds are prepared as described in detail in the examples below.

The methine compounds can be used for dyeing textile materials including synthetic polymer fibers, yarns and fabrics giving fast brilliant yellow shades when applied by conventional dyeing methods to polyester fibers. The methine compounds also have good affinity for cellulose ester and polyamide fibers. When the methine compounds are used for dyeing such hydrophobic materials, they should be free of water-solubilizing groups, such as sulfo and carboxy groups. In general, the dyes have good fastness, for example, to light, washing, gas (atmospheric fumes) and sublimation.

The following examples will serve to illustrate the preparation of representative intermediates and methine compounds of our invention.

EXAMPLE 1A.—PREPARATION OF 2,7-DIMETHYL-N - β - PHTHALIMIDOETHYL - 1,2,3,4-TETRAHYDROQUINOLINE 20.4 g. (0.1 mole) N-(β-aminoethyl)-2,7-dimethyl-1,2,3,4-tetrahydroquinoline and 14.8 g. (0.1 mole) phthalic anhydride were heated together with occasional stirring for 1 hour at 130–140° C. The reaction mixture was poured while hot into 150 ml. of hot ethyl alcohol. The product crystallizes on cooling and is collected by filtration, yield 30.5 g., M.P. 119–123° C. When recrystallized twice from ethanol, the melting point is 125.5–127° C.

EXAMPLE 1B.—FORMYLATION 6.68 g. (0.02 mole) 2,7-dimethyl-N-β-phthalimidoethyl-1,2,3,4-tetrahydroquinoline was stirred with 15 ml. of dry dimethylformamide and 2.5 ml. of phosphorous oxychloride was added at 20–25° C. The reaction was then heated on the steam bath for 1 hour and poured into 300 ml. of water. The mixture was made slightly basic with 10 percent aqueous sodium hydroxide. The yellowish-green, solid product 6-formyl-N-β-phthalimoethyl-2,7-dimethyl-1,2,3,4-tetrahydroquinoline was filtered off, washed with water, and recrystallized from 100 ml. ethyl alcohol, yield 5.1 g., M.P. 156–158° C. After a second recrystallization, M.P. 160–161° C.

EXAMPLE 1C.—PREPARATION OF DYES 7.8 g. (0.025 mole) of the aldehyde prepared in B above, 1.6 g. (0.025 mole) malononitrile, 5 drops piperidine, and 100 ml. ethyl alcohol were stirred and refluxed for 1 hour. The dye crystallized out on cooling. It was filtered, washed with a little alcohol, and dried, yield 7 g. Structure:

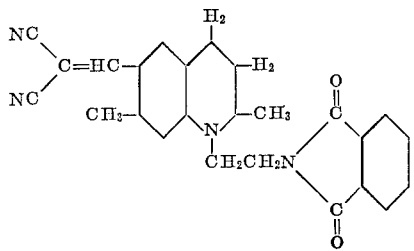

The dye colors polyester, acrylic and cellulose acetate fibers greenish-yellow shades.

The following examples are carried out using the formylated intermediates prepared as described in Examples 1A and B.

EXAMPLE 2

6.3 g. of 6-formyl-N-β-succinimidoethyl-2,7-dimethyl-1,2,3,4-tetrahydroquinoline, 1.4 g. of malononitrile, 80 cc. of ethanol and 3 drops of piperidine were refluxed for 1 hour and allowed to cool. The product (claim 3) was filtered off, washed with cold ethanol and air-dried. The product dyes cellulose acetate, Dacron and Kodel in fast greenish-yellow shades.

EXAMPLE 3

The process of Example 2 is carried out except that the aldehyde is replaced by 6.8 g. of 6-formyl-N-β-succinimidoethyl - 2,2,4,7 - tetramethyl - 1,2,3,4-tetrahydroquinoline. The product (claim 4) imparts fast yellow shades to hydrophobic fibers including polyester fibers.

EXAMPLE 4

The process of Example 2 is carried out except that the aldehyde is replaced by 6.5 g. of 6-formyl-N-γ-succinimidopropyl - 2,7 - dimethyl-1,2,3,4-tetrahydroquinoline. The product (claim 5) gives fast greenish yellow shades on dyeing polyester fibers.

EXAMPLE 5

The process of Example 2 is carried out except that the aldehyde is replaced by 7 g. of 6-formyl-N-γ-succinimidopropyl - 2,2,4,7 - tetramethyl - 1,2,3,4-tetrahydroquinoline. The product (claim 6) dyes hydrophobic fibers including polyester fibers in fast, greenish-yellow shades.

EXAMPLE 6

The process of Example 2 is carried out except that the aldehyde is replaced by 6.5 g. of 6-formyl-N-β-glutarimidoethyl - 2,7 - dimethyl-1,2,3,4-tetrahydroquinoline. A greenish-yellow dye is obtained which dyes polyester fiber the same color.

EXAMPLE 7

The process of Example 2 is carried out except that the malononitrile is replaced by 2.8 g. of β-cyanoethyl cyanoacetate. The methine dye gives greenish-yellow dyeings on polyesters.

EXAMPLE 8

The process of Example 2 is carried out except that the malononitrile is replaced by 2.6 g. of isopropyl cyanoacetate. The product imparts fast, greenish-yellow shades to hydrophobic fibers.

EXAMPLE 9

The process of Example 2 is carried out except reacting 7 g. of 6-formyl-N-Y-succinimidopropyl-2,2,4,7-tetramethyl-1,2,3,4-tetrahydroquinoline with 2.9 g. of β-methoxy ethyl cyanoacetate. The methine compound obtained dyes polyester fibers in fast yellow shades.

The methine compounds described in the following table, having structural Formula I above, are prepared in the manner of the above examples by condensation of the appropriate nitrile having a reactive methylene group, with the appropriate formylated N-dicarboximidoalkyltetrahydroquinoline of Formula II above.

*Methine compound, Formula I*

| Example No. | R | $R_1R_2R_2$ | $Z_{n-1}$ | X | Y |
|---|---|---|---|---|---|
| 10 | —CH$_2$CH$_2$CH$^2$— | 2-methyl | 7-methyl | Phthalimido | —CN |
| 11 | —CH$_2$CH$_2$— | do | None | Succinimido | —CN |
| 12 | —CH$_2$CH$_2$— | 2-isopropyl | 7-methyl | do | —CN |
| 13 | —CH$_2$CH$^2$— | 2,4-dimethyl | do | do | —CN |
| 14 | —CH$_2$CH$_2$— | 2-methyl | 8-methyl | do | —CN |
| 15 | —CH$_2$CH$_2$— | None | None | do | —CN |
| 16 | —CH—CH$_2$CH$_2$—<br>\|<br>CH$_3$ | 2-methyl | 7-methyl | do | —CN |
| 17 | —CH$_2$CH$_2$— | do | do | Maleimido | —CN |
| 18 | —CH$_2$CH$_2$— | do | do | -3-methylmaleimido | —CN |
| 19 | —CH$_2$CH$_2$— | do | do | Hexahydrophthalimido | —CN |
| 20 | —CH$_2$CH$^2$— | do | do | Tetrahydrophthalimido | —CN |
| 21 | —CH$_2$CH$_2$— | do | do | 3-nitrophthalimido | —CN |
| 22 | —CH$_2$CH$_2$— | do | do | Succinimido | —COOCH$_2$CH(CH$_3$)$_2$ |
| 23 | —CH$_2$CH$_2$— | do | do | do | —CONH$_2$ |
| 24 | —CH$_2$CH$_2$— | do | do | do | —COOCH$_3$ |
| 25 | —CH$_2$CH$_2$— | do | 7-chloro | do | —CN |
| 26 | —CH$_2$CH$_2$— | do | 7-methoxy | do | —CN |
| 27 | —CH$_2$— | do | 7-methyl | Glutarimido | —CN |

The methine compounds of the invention may be used for dyeing hydrophobic fibers such as linear polyester, cellulose ester acrylic, polyamide, etc., fibers in the manner described in U.S. Patents 2,880,050, 2,757,064, 2,782,187, and 3,043,827. The following example illustrates methods by which the methine compounds of the invention can be used to dye textile materials.

0.1 gram of the dye is dissolved in the dye pot by warming in 5 cc. of ethylene glycol monomethyl ether. A 2 percent Igepon T and 0.5 percent sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2 percent soap, 0.2 percent soda-ash solution. After scouring, the fabric is rinsed with water and dried. Accordingly, since the methine compounds of the invention are water-insoluble, they can be applied from aqueous dispersions in the manner of the so-called "dispersed dyes." However, coloration can also be effected, for example, by incorporating the methine compounds into the spinning dope and spinning the fiber as usual. The methine compounds of our invention have varying utility as dyes. The degree of utility varies, for example, depending upon the material being dyed and the formula of the methine compound. Thus, for example, all the dyes will not have the same degree of utility for the same material.

Cellulose esters which can be dyed with the methine compounds include cellulose aliphatic carboxylic acid esters having 2 to 4 carbon atoms in the acid groups thereof, by which we mean to include, for example, both partially hydrolyzed and unhydrolyzed cellulose acetate, cellulose propionate and cellulose acetate-butyrate.

Polymeric linear polyester materials of the terephthalate type are illustrative of the linear aromatic polyester textile materials that can be dyed with the new methine compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745, and 2,989,363, for example, can be dyed. The linear aromatic polyester materials specifically named have a melting point of at least 200° C.

Nylon, in fiber, yarn and fabric form is representative of polyamides which can be dyed with the methine compounds.

The invention has been described in considerable detail with particular reference to certain preferred embodiments thereof, but it will be understood that variations and modifications can be effected within the spirit and scope of the invention as described hereinabove, and as defined in the appended claims.

What we claim is:
1. A methine compound of the formula

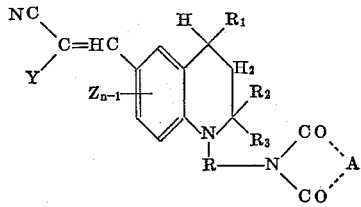

wherein

R=lower alkylene,
$R_1$, $R_2$ and $R_3$ each=hydrogen or lower alkyl,
A=the carbon atoms necessary to complete a ring containing 4 to 5 carbon atoms in addition to the nitrogen atom,
Y=CN, $CONH_2$, lower carbalkoxy or lower cyanocarbalkoxy,
Z=lower alkyl, lower alkoxy or halogen, and
n=a positive integer of from 1 to 4.

2. The compound

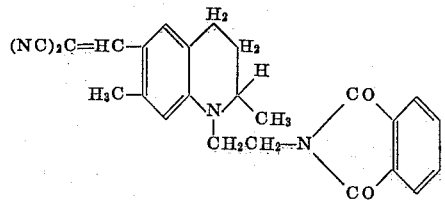

3. The compound

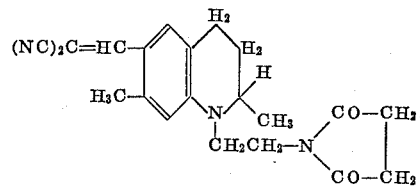

4. The compound

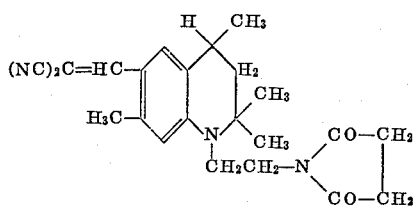

5. The compound

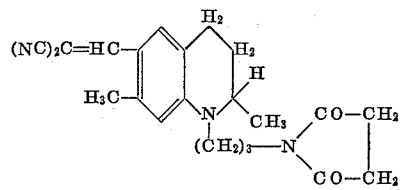

6. The compound

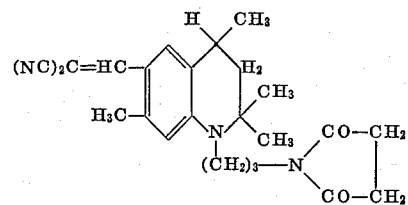

7. A methine compound of the formula

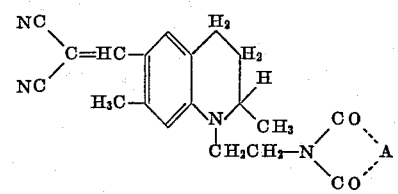

wherein A=the carbon atoms necessary to complete a ring containing 4 to 5 carbon atoms in addition to the nitrogen atom.

8. A methine compound of the formula

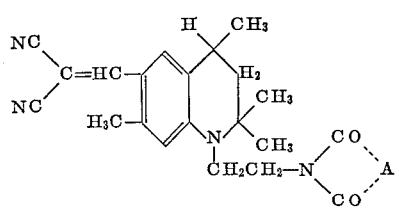

wherein A=the carbon atoms necessary to complete a ring containing 4 to 5 carbon atoms in addition to the nitrogen atom.

References Cited by the Examiner

UNITED STATES PATENTS

| | | | |
|---|---|---|---|
| 2,220,219 | 11/1940 | Stott | 8—55 |
| 2,330,203 | 9/1943 | Brooker et al. | 260—240.4 |
| 2,600,380 | 6/1952 | Derek | 260—287 |
| 3,013,013 | 12/1961 | Carboni | 260—240 |
| 3,015,662 | 1/1962 | Rorig | 260—240.4 |
| 3,023,213 | 2/1962 | Richter | 260—287 |
| 3,036,876 | 5/1962 | Schoellig et al. | 8—55 |

FOREIGN PATENTS 894,859   4/1962   Great Britain.

OTHER REFERENCES

United States Publications Board, Report No. 70, 336, Frames 7613–7616, April 15, 1936.

NICHOLAS S. RIZZO, *Primary Examiner.*

JOHN D. RANDOLPH, *Examiner.*